United States Patent [19]

Bhattacharyya et al.

[11] Patent Number: 5,051,487
[45] Date of Patent: Sep. 24, 1991

[54] HYDROPHOBIC CATIONIC TERPOLYMERS FROM ACRYLAMIDE, DIMETHYLAMINOETHYLACRYLATE METHYL CHLORIDE OR SULFATE AND VINYL ACETATE

[75] Inventors: Bhupati R. Bhattacharyya, Downers Grove; Michael R. St. John, Chicago, both of Ill.

[73] Assignee: Nalco Chemical Company, Naperville, Ill.

[21] Appl. No.: 325,841

[22] Filed: Mar. 20, 1989

[51] Int. Cl.$^5$ .................... C08F 228/02; C08F 226/02
[52] U.S. Cl. .................................. 526/287; 526/292.2
[58] Field of Search .................... 526/292.2, 287, 307.3

[56] References Cited

U.S. PATENT DOCUMENTS

| | | | |
|---|---|---|---|
| 4,396,752 | 8/1983 | Cabestany | 526/287 |
| 4,617,362 | 10/1986 | Becker | 526/209 |
| 4,857,621 | 8/1989 | Ball | 526/265 |

Primary Examiner—Christopher Henderson
Attorney, Agent, or Firm—Wallenstein, Wagner & Hattis, Ltd.

[57] ABSTRACT

Hydrophobic cationic terpolymers resulting from the polymerization of a mixture of monomers of (a) acrylamide and/or methacrylamide, (b) dimethylaminoethylacrylate methyl chloride and/or dimethylaminoethylacrylate methyl sulfate, and (c) vinyl acetate; water-in-oil and oil-in-water emulsions containing said terpolymers; and dewatering of wastes and sludges utilizing said oil-in-water emulsions in which the terpolymers are present essentially in the aqueous phase.

9 Claims, No Drawings

HYDROPHOBIC CATIONIC TERPOLYMERS FROM ACRYLAMIDE, DIMETHYLAMINOETHYLACRYLATE METHYL CHLORIDE OR SULFATE AND VINYL ACETATE

DESCRIPTION

1. Technical Field

The present invention relates to novel apolar or hydrophobic (hereafter "hydrophobic") terpolymers and emulsions containing said terpolymers, and to the dewatering of wastes and sludges utilizing said terpolymers.

2. Background Prior Art

It has long been known to the art to utilize polymers of various types for the dewatering of wastes and sludges. Numerous patents and other publications disclose particular polymers, and the preparation thereof, for use in such dewatering. Illustrative thereof is U.S. Pat. No. 4,191,645, in which cationic copolymers for such usage are disclosed to have been prepared from a nonionic monomer, for instance, acrylamide, and a cationic monomer, for instance, trimethylammoniumethylethacrylate methyl sulfate (TMAEM.MSQ). The patent also describes prior known processes for preparing such cationic copolymers by dissolving the totality of the selected nonionic and cationic monomers in water, emulsifying the monomer solution in a hydrocarbon oil to form a water-in-oil emulsion composition, then effecting monomer copolymerization in the dispersed aqueous phase of said emulsion composition to obtain the desired degree of polymerization, and then inverting said emulsion in added water in conjunction with the addition of an inverting surfactant to produce an oil-in-water emulsion whereby to release the previously produced cationic copolymer to the continuous aqueous phase of the emulsion composition. The resulting emulsion composition is then admixed with wastes or sludges at selected dosage levels to effect dewatering of such wastes or sludges. That part of the foregoing type of process in which the water-in-oil emulsion containing the cationic copolymer is produced is hereafter referred to as the batch process.

The aforesaid patent also discloses what the patent states constitutes an improvement over such, and other, prior known processes for dewatering sewage sludges, which improvement involves utilizing as the dewatering copolymer a predetermined formulation of a cationic copolymer to be formed from (a) a major quantity of the nonionic monomer and (b) a minor quantity of the cationic monomer of greater reactivity than that of the nonionic monomer, (1) preparing an aqueous solution of the total quantity of the nonionic monomer and up to 95 mole percent of the total quantity of said cationic monomer to be employed by said predetermined copolymer formulation, thus providing a withheld portion of said cationic monomer; (2) emulsifying said aqueous solution in a hydrocarbon oil to provide a water-in-oil emulsion; (3) initiating the polymerization reaction; and (4) continuing the polymerization reaction while incrementally adding thereto said withheld portion of said cationic monomer until substantially all of the nonionic monomer and cationic monomer react to produce said cationic copolymer. The resulting water-in-oil emulsion is then inverted to produce an oil-in-water emulsion and said inverted emulsion is admixed with a sewage sludge whereby water is removed from the thus-treated sludge.

SUMMARY OF THE INVENTION

The present invention is directed to novel hydrophobic cationic terpolymers and to emulsions containing said terpolymers and the preparation thereof, as well as the use of said terpolymers or emulsions for dewatering wastes and sludges; and wherein said hydrophobic cationic terpolymers are derived or result from the polymerization of a mixture of monomers of (a) at least one member selected from the group consisting of acrylamide and methacrylamide, (b) at least one member selected from the group consisting of dimethylaminoethylacrylate methyl chloride (DMAEA.MCQ) and dimethylaminoethylacrylate methyl sulfate (DMAEA.MSQ), and (c) vinyl acetate.

DETAILED DESCRIPTION OF THE INVENTION

In the preparation of the novel hydrophobic cationic terpolymers of the present invention, the mole % of the above-stated (a), (b) and (c) monomers utilized fall within the range of about 4 to about 84 for the (a) monomer; about 10 to about 90 for the (b) monomer; and about 6 to about 26 for the (c) monomer. A preferred mole % range is about 30 to about 70 for the (a) monomer, about 15 to about 50 for the (b) monomer, and about 10 to about 20 for the (c) monomer. The most preferred and particularly advantageous mole % range, in generally most cases, is about 50 to about 65 for the (a) monomer, about 25 to about 35 for the (b) monomer, and about 11 to about 16 for the (c) monomer.

It has been found, pursuant to the present invention, that hydrophobic cationic terpolymers, generally speaking, possess improved properties in the dewatering of wastes and sludges in relation to various polymers and copolymers which have heretofore been used or recommended for use for such dewatering. This may be evaluated from the standpoint of measuring the filtration rates of the particular dewatering terpolymers of the present invention in relation to heretofore known polymers or copolymers, at the same given dosage rates thereof; or, alternatively, determining differences in the dosage rates of the particular dewatering terpolymers of the present invention in relation to heretofore known polymers or copolymers to achieve essentially equal filtration rates. Data with respect to comparative dewatering tests run on certain municipal sludges using illustrative hydrophobic cationic terpolymers compositions of the present invention and a prior known type of dewatering copolymer are described below.

Initially, however, Examples are given of the preparation of hydrophobic cationic terpolymers and emulsions containing said terpolymers, pursuant to the present invention. It is to be understood that these Examples are given by way of illustration only and not by way of limitation as other hydrophobic cationic terpolymers and emulsions containing the same, falling within the scope of the present invention, can readily be prepared in light of the teachings and guiding principles disclosed herein. All temperatures are in °C.

EXAMPLE 1

55 Mole % Acrylamide
34 Mole % DMAEA.MCQ
11 Mole % Vinyl Acetate

| INGREDIENTS | Wt. % |
|---|---|
| Acrylamide (46.8% Solution in H$_2$O) | 21.90 |
| DMAEA.MCQ (61% Solution in H$_2$O) | 28.31 |
| Vinyl Acetate | 2.48 |
| Water | 18.72 |
| Adipic Acid | 1.50 |
| Sodium Formate | 0.02 |
| "VERSENE" (ethylenediamine tetraacetic acid, sodium salt) | 0.01 |
| "LOPS" (low odor paraffinic solvent) | 25.00 |
| "SPAN" 80 (sorbitan monooleate) | 1.50 |
| "TWEEN" 61 (PEO(4) sorbitan monostearate) | 0.50 |
| "VAZO" 64 (2,2'-azobis isobutyronitrile) | 0.06 |
| | 100.00 |

PROCEDURE

The "SPAN" 80 and the "TWEEN" 61 are dissolved in the "LOPS", using moderate heat, for instance about 40°-50°, while stirring, and the resulting solution is placed in a 2-liter glass reactor fitted with a stirrer, thermometer and nitrogen purge. The acrylamide, DMAEA.MCQ and vinyl acetate are added to and mixed with the water to form a solution to which the adipic acid, the sodium formate and the "VERSENE" are added, while stirring, until dissolution is complete or essentially complete. The resulting solution is added to the "LOPS" solution with rapid agitation, the emulsion which forms is purged with nitrogen and heated to about 45°. After about ½ hour the "VAZO" 64 is added with stirring, and the reaction is allowed to proceed for about 4 hours at about 45°. The reaction mixture is post-heated at about 65° for about 1 hour.

The resulting water-in-oil emulsion is inverted by adding thereto and admixing therewith about equal parts by wt. of an approximately 1 to 4%, preferably about a 2%, water solution of "TRITON" X-114 (an ethoxylated alkylphenol surfactant). The intrinsic viscosity of the terpolymer composition, in the case of EXAMPLES 1 and 2, is approximately 8.3. The terpolymer may readily be recovered from the aqueous phase, but it is unnecessary to do so since the inverted emulsion is conveniently utilized as such for addition, in the selected dosages, of the terpolymer to the wastes or sludges to be dewatered.

The following additional Examples are set forth below to which the foregoing procedure is applicable.

EXAMPLE 2

50 Mole % Acrylamide
34 Mole % SMAEA.MCQ
16 Mole % Vinyl Acetate

| INGREDIENTS | Wt. % |
|---|---|
| Acrylamide (46.8% Solution in H$_2$O) | 19.78 |
| DMAEA.MCQ (61% Solution in H$_2$O) | 28.12 |
| Vinyl Acetate | 3.59 |
| Water | 19.92 |
| Adipic Acid | 1.50 |
| Sodium Formate | 0.02 |
| "VERSENE" | 0.01 |
| "LOPS" | 25.00 |
| "SPAN" 80 | 1.50 |
| "TWEEN" 61 | 0.50 |
| "VAZO" 64 | 0.06 |
| | 100.00 |

EXAMPLE 3

60 Mole % Acrylamide
34 Mole % DMAEA.MCQ
6 Mole % Vinyl Acetate

| INGREDIENTS | Wt. % |
|---|---|
| Acrylamide (46.8% Solution in H$_2$O) | 24.05 |
| DMAEA.MCQ (61% Solution in H$_2$O) | 28.50 |
| Vinyl Acetate | 1.36 |
| Water | 17.50 |
| Adipic Acid | 1.50 |
| Sodium Formate | 0.02 |
| "VERSENE" | 0.01 |
| "LOPS" | 25.00 |
| "SPAN" 80 | 1.50 |
| "TWEEN" 61 | 0.50 |
| "VAZO" 64 | 0.06 |
| | 100.00 |

EXAMPLE 4

55 Mole % Acrylamide
34 Mole % DMAEA.MSQ
11 Mole % Vinyl Acetate

| INGREDIENTS | Wt. % |
|---|---|
| Acrylamide (46.8% Solution in H$_2$O) | 17.88 |
| DMAEA.MSQ (75% Solution in H$_2$O) | 26.14 |
| Vinyl Acetate | 2.03 |
| Water | 25.36 |
| Adipic Acid | 1.50 |
| Sodium Formate | 0.02 |
| "VERSENE" | 0.01 |
| "LOPS" | 25.00 |
| "SPAN" 80 | 1.50 |
| "TWEEN" 61 | 0.50 |
| "VAZO" 64 | 0.06 |
| | 100.00 |

EXAMPLE 5

50 Mole % Acrylamide
34 Mole % DMAEA.MSQ
16 Mole % Vinyl Acetate

| INGREDIENTS | Wt. % |
|---|---|
| Acrylamide (46.8% Solution in H$_2$O) | 16.17 |
| DMAEA.MSQ (75% Solution in H$_2$O) | 26.00 |
| Vinyl Acetate | 2.91 |
| Water | 26.33 |
| Adipic Acid | 1.50 |
| Sodium Formate | 0.02 |
| "VERSENE" | 0.01 |
| "LOPS" | 25.00 |
| "SPAN" 80 | 1.50 |
| "TWEEN" 61 | 0.50 |
| "VAZO" 64 | 0.06 |
| | 100.00 |

EXAMPLE 6

55 Mole % Methacrylamide
34 Mole % DMAEA.MCQ
11 Mole % Vinyl Acetate

| INGREDIENTS | Wt. % |
|---|---|
| Methacrylamide (45% Solution in H$_2$O) | 25.73 |
| DMAEA.MCQ (61% Solution in H$_2$O) | 26.40 |

-continued

| INGREDIENTS | Wt. % |
|---|---|
| Vinyl Acetate | 2.32 |
| Water | 16.96 |
| Adipic Acid | 1.50 |
| Sodium Formate | 0.02 |
| "VERSENE" | 0.01 |
| "LOPS" | 25.00 |
| "SPAN" 80 | 1.50 |
| "TWEEN" 61 | 0.50 |
| "VAZO" 64 | 0.06 |
| | 100.00 |

EXAMPLE 7

39 Mole % Acrylamide
50 Mole % DMAEA.MCQ
11 Mole % Vinyl Acetate

| INGREDIENTS | Wt. % |
|---|---|
| Acrylamide (46.8% Solution in $H_2O$) | 13.26 |
| DMAEA.MCQ (61% Solution in $H_2O$) | 35.53 |
| Vinyl Acetate | 2.12 |
| Water | 20.50 |
| Adipic Acid | 1.50 |
| Sodium Formate | 0.02 |
| "VERSENE" | 0.01 |
| "LOPS" | 25.00 |
| "SPAN" 80 | 1.50 |
| "TWEEN" 61 | 0.50 |
| "VAZO" 64 | 0.06 |
| | 100.00 |

EXAMPLE 8

74 Mole % Acrylamide
15 Mole % DMAEA.MCQ
11 Mole % Vinyl Acetate

| INGREDIENTS | Wt. % |
|---|---|
| Acrylamide (46.8% Solution in $H_2O$) | 37.00 |
| DMAEA.MCQ (61% Solution in $H_2O$) | 15.68 |
| Vinyl Acetate | 3.12 |
| Water | 15.61 |
| Adipic Acid | 1.50 |
| Sodium Formate | 0.02 |
| "VERSENE" | 0.01 |
| "LOPS" | 25.00 |
| "SPAN" 80 | 1.50 |
| "TWEEN" 61 | 0.50 |
| "VAZO" 64 | 0.06 |
| | 100.00 |

Test Data Regarding Dewatering Using Illustrative Hydrophobic Cationic Terpolymers of Acrylamide (AcAm)/DMAEA.MCQ/Vinyl Acetate (VINAC) vs. Illustrative Copolymer of AcAm/DMAEA.MCO The following dewatering activity data are presented for illustrative hydrophobic cationic terpolymers of the present invention, utilizing, in the preparation thereof, acrylamide, DMAEA.MCQ and vinyl acetate in the mole % proportions stated in TABLE I, the terpolymers of Nos. 150, 151 and 149 corresponding to the above EXAMPLES 1, 2 and 3, respectively. Also set forth in TABLE I under polymer No. 146 is a copolymer of acrylamide and DMAEA.MCQ which was used as a blank and as being reasonably representative of known dewatering polymers for comparative purposes. Intrinsic viscosity measurements are also shown.

TABLE I

| | Mole % AcAm | Mole % DMAEA.MCQ | Mole % VINAC | IV |
|---|---|---|---|---|
| Polymer | | | | |
| 146 (Blank) | 66 | 34 | 0 | 11.70 |
| Terpolymer | | | | |
| 149 | 60 | 34 | 6 | 10.80 |
| 150 | 55 | 34 | 11 | 8.37 |
| 151 | 50 | 34 | 16 | 8.33 |
| 227 | 50 | 34 | 16 | 10.90 |
| 229 | 40 | 34 | 26 | 8.24 |

AcAm = Acrylamide
DMAEA.MCQ = Dimethylaminoethylacrylate Methyl Chloride
VINAC = Vinyl Acetate
IV = Intrinsic Viscosity Activity testing was carried out on five municipal anaerobic sludges. Three of said five sludges were collected from the Stickney, Ill. waste treatment plant at different times, and the other two sludges were collected from the Aurora, Ill. waste treatment plant. Dewatering criteria or performances were evaluated or based upon the free drainage of conditioned sludge after 10 seconds, or, in other words, by the amount of filtrate obtained after 10 seconds (i.e., a filtration rate) by gravity filtration of the conditioned sludge through twin belt press filter fabric at fixed polymer doses. A performance index (PI) was determined by taking the ratio of the filtrate volume obtained with the terpolymers to the filtrate volume obtained with the copolymer (No. 146). Thus, PI values greater than 1 indicate increased filtration rates, and less than 1 decreased filtration rates.

The following TABLES II through IV present the PI data for the three Stickney sludges and TABLES V and VI data for the Aurora sludges. The ppm dosages of the terpolymers are based upon the weight of the sludges.

In the TABLES, PI's are given for a range of the terpolymer and the copolymer dosage which correspond to values needed for at least partly acceptable dewatering to occur. The particular dose required for optimal results generally varies according to the equipment being used and the particular needs of the waste treatment plant. For the Stickney sludges, dewatering activity of the terpolymers at lower dosages is about equal to or better than the copolymer. At higher dosages, the terpolymers perform particularly well (TABLES II and III) and exhibit performance increases in the range of about 25 to about 30%. Differences are observed between the sludges as a consequence of sludge changes but, in any case, the terpolymers performed at least as well, and, in most cases, distinctly better than the copolymer.

With respect to TABLES V and VI, dealing with tests run on the Aurora, Ill. sludges, terpolymers of the present invention, at lower ranges of dosages, performed about the same as the copolymer; whereas, at higher dosage ranges, the terpolymers performed somewhat better than the copolymer. Because of differences in the composition of sludges, relative dewatering performances may be expected to vary at least somewhat.

TABLE II

PI (with respect to Copolymer 146) for Terpolymers Added to Stickney Sludge #1 at Various Fixed Terpolymer Doses*

| Terpolymer | PI @ 120 ppm | 144 ppm | 168 ppm | 192 ppm |
|---|---|---|---|---|
| 150 | 1.04 | 1.00 | 1.29 | 1.22 |
| 151 | 1.15 | 1.10 | 1.37 | 1.23 |

*Terpolymer concentration in conditioned sludge

TABLE III

PI (with respect to Copolymer 146) for Terpolymers Added to Stickney Sludge #2 at Various Fixed Terpolymer Doses*

| Terpolymer | PI @ 112 ppm | 134 ppm | 157 ppm | 179 ppm |
|---|---|---|---|---|
| 149 | 1.27 | 1.26 | 1.11 | 1.18 |
| 150 | 0.96 | 1.26 | 1.30 | 1.41 |
| 151 | 0.82 | 1.16 | 1.32 | 1.53 |
| 227 | 1.19 | 1.11 | 1.19 | 1.03 |
| 229 | 1.00 | 0.96 | 0.99 | 1.28 |

*Terpolymer concentration in conditioned sludge

TABLE IV

PI (with respect to Copolymer 146) for Terpolymers Added to Stickney Sludge #3 at Various Fixed Terpolymer Doses*

| Terpolymer | PI @ 144 ppm | 180 ppm | 204 ppm |
|---|---|---|---|
| 150 | 1.00 | 1.19 | 1.33 |
| 151 | 0.97 | 1.08 | 1.15 |
| 227 | 0.84 | 0.94 | 1.03 |
| 229 | 0.78 | 0.94 | 1.18 |

*Terpolymer concentration in conditioned sludge

TABLE V

PI (with respect to Copolymer 146) for Terpolymers Added to Aurora Sludge #1 at Various Fixed Terpolymer Doses*

| Terpolymer | PI @ 67 ppm | 90 ppm | 112 ppm | 134 ppm |
|---|---|---|---|---|
| 149 | 0.84 | 0.96 | 1.02 | 0.99 |
| 150 | 0.86 | 0.95 | 1.03 | 0.99 |
| 227 | 0.91 | 0.95 | 1.06 | 1.07 |
| 229 | 0.91 | 0.93 | 1.07 | 1.09 |

*Terpolymer concentration in conditioned sludge

TABLE VI

PI (with respect to Copolymer 146) for Terpolymers Added to Aurora Sludge #2 at Various Fixed Terpolymer Doses*

| Terpolymer | PI @ 94 ppm | 118 ppm | 142 ppm | 165 ppm |
|---|---|---|---|---|
| 150 | 0.90 | 0.92 | 1.15 | 1.48 |
| 151 | 1.11 | 0.97 | 1.09 | 1.12 |

*Terpolymer concentration in conditioned sludge

The terpolymers of the present invention which result from the use of about 11 to about 16 mole % of vinyl acetate are, generally, highly effective. At mole % usage of vinyl acetate below about 6 in the preparation of the terpolymers, there does not appear to be any significant dewatering improvement over the use of known polymers or copolymers. At mole % usage of vinyl acetate above about 26 in the preparation of the terpolymers, dewatering activity tends to decline in relation to the use of known polymers or copolymers.

The terpolymers of EXAMPLES 1 and 2, the emulsions prepared therefrom and the use of the oil-in-water emulsions for the dewatering of wastes and sludges are considered, as presently aware, to constitute the best embodiments of the present invention. As indicated above, however, it should be understood that those terpolymers of the present invention which are particularly advantageous in the dewatering of certain wastes or sludges are not necessarily similarly effective when applied to the dewatering of various other particular wastes or sludges. Overall, what has been set forth above as being considered as the best embodiments of the present invention is, generally speaking, correct.

The Emulsions of the Hydrophobic Cationic Terpolymers

The emulsions of the hydrophobic cationic terpolymers of the present invention, as initially produced as described above, are emulsions of the water-in-oil type which are then inverted to form oil-in-water type emulsions for use in the dewatering of wastes and sludges.

The water-in-oil emulsions of the hydrophobic cationic terpolymers of the present invention contain four essential components which, and their weight percentages in the emulsions, are as follows:

A. Terpolymer, from about 5 to about 60%, preferably from about 20 to about 40%, and most preferably from about 25 to about 35%.

B. Water, from about 20 to about 90%, preferably from about 25 to about 70%, and most preferably from about 30 to about 55%.

C. Water-immiscible liquid, from about 5 to about 75%, preferably from about 10 to about 40%, and most preferably from about 20 to about 30%.

D. Water-in-oil emulsifier, from about 0.1 to about 20%, preferably from about 1 to about 15%, and most preferably from about 1.2 to about 10%.

The water-in-oil emulsions of the terpolymers may also be characterized with respect to the aqueous phase of the emulsions. The aqueous phase may generally be defined as the sum of the terpolymer and the water present in the emulsion. So viewed, the aqueous phase of the water-in-oil emulsions generally constitutes from about 25 to about 95% by weight of the emulsions, preferably from about 35 to about 60%, and most preferably from about 40 to about 50%.

The emulsions may also be characterized in relation to the water/oil ratios, namely, the ratio of the weight of water divided by the weight of the water-immiscible liquid present in the emulsions. Generally, the water-in-oil emulsions of this invention have a water/oil ratio of from about 0.25 to about 18, preferably from about 0.5 to about 10, and most preferably from about 1 to about 3.

Physical Properties of The Water-In-Oil Emulsions

The water-in-oil emulsions of the hydrophobic cationic terpolymers are quite stable when the particle sizes of the terpolymers are in the range of about 0.01 to about 5 microns. The preferred particle sizes are generally in the range of from about 0.5 microns to about 3 microns, most preferred particle sizes being generally in the range of from about 0.2 to about 2 microns.

The emulsions generally have a viscosity in the range of from about 50 to about 1000 cps. However, the viscosity of these emulsions can be affected greatly by increasing or decreasing the terpolymer content, oil content, or water content as well as the choice of a suitable water-in-oil emulsifier.

The Preparation of the Water-In-Oil Emulsions

A very satisfactory procedure has been described above for the preparation of the water-in-oil emulsions of the hydrophobic cationic terpolymers. Various other procedures which are generally know to the art for the preparation of water-in-oil emulsions of polymers or copolymers derived from monomers can be utilized as shown, for instance, in U.S. Pat. Nos. 3,284,393; Re. No. 28,474; Re. No. 28,576; 3,826,771; 3,767,629 and 3,996,180, the disclosures of which are herein incorporated by reference. With respect to the present invention, after forming the water-in-oil emulsion of (1) a solution in water containing the monomers disclosed above to produce the hydrophobic cationic terpolymer, and other ingredients of conventional character, and (2) the water-immiscible liquid, in the presence of the water-in-oil emulsifier, polymerization is then carried out to produce the terpolymer in said emulsion. The polymerization is particularly advantageously carried out under free radical catalyst conditions, utilizing organic peroxides, redox type initiator systems, "VAZO" type material, for instance, "VAZO" 64, as shown above, etc. Other polymerization techniques, including those which are known to the art, can be used such as ultraviolet light, microwaves, etc.

The Water-In-Oil Emulsifiers

Generally speaking, almost any conventional water-in-oil emulsifier can be used, for instance, sorbitan monostearate, sorbitan monooleate, and the so-called low HLB materials which are all documented in the literature and are summarized in the Atlas HLB Surfactant Selector. Although the mentioned emulsifiers are used in producing water-in-oil emulsions, other surfactants may be used so long as they are capable of producing such emulsions.

U.S. Pat. No. 3,997,492 shows the use of emulsifiers generally have generally higher HLB values to produce stable emulsions similar in character to those discussed above. With the use of the equations present in this patent, emulsifiers having HLB values between 4 and 9 can be effectively utilized in the practice of the present invention. In addition to said patent, U.S. Pat. No. 4,024,097 discloses particular emulsifiers for producing the water-in-oil emulsions, which emulsifiers can be used to prepare the water-in-oil emulsions of the present invention. The foregoing patents, as to the disclosure of emulsifiers for producing water-in-oil emulsions, are incorporated herein by reference.

The Water-Immiscible Liquids

The water-immiscible liquids or oils which are used in preparing the emulsions of the present invention may be selected from a large group of such organic liquids which include, particularly, liquid hydrocarbons and substituted liquid hydrocarbons. A preferred group of organic liquids which can be utilized in the practice of this invention are straight-chain and branch-chain paraffinic hydrocarbon oils. Examples of these types of materials include a branch-chain isoparaffinic solvent sold under the trade designation "Isopar M" described in U.S. Pat. No. 3,642,019, and a paraffinic solvent sold by the Exxon Company, U.S.A. called "Low Odor Paraffinic Solvent", commonly designated as "LOPS". Typical specifications of this latter solvent are as follows:

| | |
|---|---|
| Specific Gravity 60°/60° F. | 0.780-0.806 |
| Color, Saybolt | +30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |
| Sulfur, ppm, Microcoulometer | 15 max. |

While, as sated above, paraffinic oils are the preferred materials for use in preparing the emulsions of this invention, other water-immiscible organic liquids can be utilized. These include, for instance, mineral oils, kerosenes, naphthas; and, also, aromatic solvents such as benzene, xylene and toluene, and other water-immiscible hydrocarbons. Those which have low flash points or toxic properties are generally avoided due to problems associated with their handling. The water-immiscible liquids are non-reactive or essentially non-reactive with the terpolymers.

The Inversion of the Water-In-Oil Emulsions Of The Terpolymers

The water-in-oil emulsions of the terpolymers described above can readily be inverted when added to aqueous solutions in the presence of an inverting agent or under physical stress. Upon inversion, the emulsion releases the terpolymer into the water phase in a very short period of time. This inversion technique is described in U.S. Pat. No. 3,624,019. As stated in said patent, inversion can be effected by any number of means, most conveniently by the use of a surfactant. The placement of the surfactant into the water causes the emulsion to rapidly invert and release the terpolymer in the form of an aqueous solution. When this technique is used to invert the terpolymer-containing emulsion the amount of surfactant present in the water may vary over a range of about 0.01 to about 50% based on the terpolymer. Good inversion generally occurs within the range of about 1.0 to about 10% based on the terpolymer.

The preferred surfactants utilized to cause the inversion of the water-in-oil emulsion of this invention when the emulsion is added to or admixed with water are hydrophilic and, desirably, are readily water-soluble. Illustrative hydrophilic type surfactants such as ethoxylated nonyl phenols, ethoxylated nonyl phenol formaldehyde resins, dioctyl esters of sodium sulfo-succinate and octyl phenol polyethoxy ethanols can effectively be used. Preferred surfactants are generally, nonyl phenols which have been ethoxylated with from 8 to 15 moles of ethylene oxide. A more complete list of surfactants usable to invert the emulsions is found in the aforesaid patent, the disclosure of which is incorporated herein by reference.

The Wastes and Sludges

The wastes and sludges which are treatable to effect dewatering thereof by the terpolymers or the oil-in-water inverted emulsions of the present invention are of diversified character. They comprise industrial wastes, municipal wastes such as sewage or activated sewage sludges, and biological wastes or sludges which may constitute secondary anaerobically or aerobically digested sludges. It is well recognized that particular wastes or sludges vary in their dewatering characteristics and in their contents of solids. Illustrative of such wastes or sludges are those which contain from about 1 to about 3% wt. % of solids.

Dosages of Terpolymers in Dewatering

Dosages of the terpolymers are variable depending upon the particular wastes or sludges. Generally, the ranges of such dosages are from about 100 to about 400 ppm of the terpolymer (active basis) based on the weight of the wastes or sludges, preferably in the range of from about 140 to about 300.

We claim:

1. A hydrophobic cationic terpolymer resulting from the polymerization of a mixture of monomers of (a) at least one member selected from the group consisting of acrylamide and methacrylamide, (b) at least one member selected from the group consisting of dimethylaminoethylacrylate methyl chloride and dimethylaminoethylacrylate methyl sulfate, and (c) vinyl acetate, the mole % of said (a), (b), and (c) monomers being in the range of from about 4 to about 84 for the (a) monomer, from about 10 to about 90 for the (b) monomer, and from about 6 to about 26 for the (c) monomer.

2. The terpolymer of claim 1 wherein the mole % of the (a) monomer is in the range of from about 30 to about 70.

3. The terpolymer of claim 1 wherein the mole % of the (a) monomer is in the range of from about 50 to about 65.

4. The terpolymer of claim 1 wherein the mole % of the (b) monomer is in the range of from about 15 to about 50.

5. The terpolymer of claim 1 wherein the mole % of the (b) monomer is in the range of from about 25 to about 35.

6. The terpolymer of claim 1 wherein the mole % of the (c) monomer is in the range of from about 10 to about 20.

7. The terpolymer of claim 1 wherein the mole % of the (c) monomer is in the range of from about 11 to about 16.

8. The terpolymer of claim 1 wherein the mole % is in the range of from about 30 to about 70 for the (a) monomer, from about 15 to about 50 for the (b) monomer, and from about 10 to about 20 for the (c) monomer.

9. The terpolymer of claim 1 wherein the mole % is in the range of from about 50 to about 65 for the (a) monomer, from about 25 to about 35 for the (b) monomer, and from about 11 to about 16 for the (c) monomer.

* * * * *

UNITED STATES PATENT AND TRADEMARK OFFICE
CERTIFICATE OF CORRECTION

PATENT NO. : 5,051,487
DATED : September 24, 1991
INVENTOR(S) : Bhattacharyya et al.

It is certified that error appears in the above-identified patent and that said Letters Patent is hereby corrected as shown below:

Column 3, line 53, delete "SMAEA.MCQ" and insert --DMAEA.MCQ--.

Column 5, line 56, delete "DMAEA.MCO" and insert --DMAEA.MCQ--.

Column 9, line 60, before "organic" insert --such--.

Column 10, line 13, delete "sated" and insert --stated--.

Column 10, line 23, after "are" insert --inert or--.

Column 10, line 24, after "with" insert --respect to the monomers and--.

Signed and Sealed this

Twentieth Day of April, 1993

Attest:

MICHAEL K. KIRK

*Attesting Officer*    *Acting Commissioner of Patents and Trademarks*